US006318196B1

(12) United States Patent
Chang

(10) Patent No.: US 6,318,196 B1
(45) Date of Patent: Nov. 20, 2001

(54) STRUCTURE OF A PISTOL-LIKE AUTOMOBILE CENTER LOCK DRIVING APPARATUS

(76) Inventor: Chung-I Chang, PO Box 82-144, Taipei (TW)

( * ) Notice: Subject to any disclaimer, the term of this patent is extended or adjusted under 35 U.S.C. 154(b) by 0 days.

(21) Appl. No.: 09/431,961

(22) Filed: Nov. 1, 1999

(51) Int. Cl.$^{7}$ .............................. F16H 19/04; E05C 1/04

(52) U.S. Cl. ........................ 74/89.12; 74/89.17; 292/144; 292/DIG. 62; 464/160

(58) Field of Search ................................ 74/89.12, 89.17, 74/422; 292/144, DIG. 62; 464/160

(56) References Cited

U.S. PATENT DOCUMENTS 4,759,192 * 7/1988 Bertram et al. .................. 464/160 X
4,819,493 * 4/1989 Dornan ................................ 74/89.17
4,864,322 * 9/1989 Yamamoto et al. ................. 343/903
4,889,002 * 12/1989 Abraham ............................. 74/89.15
5,173,716 * 12/1992 Tetsuka ............................ 464/160 X
5,215,447 * 6/1993 Wen ..................................... 417/415
6,119,538 * 9/2000 Chang .............................. 464/160 X

* cited by examiner

*Primary Examiner*—Allan D. Herrmann
(74) *Attorney, Agent, or Firm*—A & J

(57) ABSTRACT

The present invention relates to an improved structure of an automobile center lock driving apparatus, and in particular to an center lock driving apparatus having an inertia gear module. The driving apparatus comprises a driving pull-rod, a transmission gear, an inertia clutching gear, an active gear and a motor. The apparatus provides a solution to wear of the gears, dislocation of the gears, and "dead lock" of the driving pull-rod, and gear damages as a result of shock caused by dislocation of transmission gear modules. At instantaneous driving, the driving pull-rod can be driven more smoothly and stable as a result of the inertia gap between the gear modules.

1 Claim, 5 Drawing Sheets

STRUCTURE OF A PISTOL-LIKE AUTOMOBILE CENTER LOCK DRIVING APPARATUS

BACKGROUND OF THE INVENTION a) Technical Field of the Invention

The present invention relates to an improved structure of a pistol-like automobile center lock driving apparatus, wherein the inertia gap formed between gear modules provides the ability of dislocation from the engagement of a transmission gear and an inertia clutching gear to form a gear gap.

b) Description of the Prior Art

As shown in FIG. 1, there is shown a conventional pistol-like center lock comprising a driving pull-rod A1, various gear modules A2 and a motor A3. The drawbacks of this conventional center lock are as follows:

(1) There is no gap formed between the gear modules, any vibration and inertia force formed as a result of pulling or pushing of the driving pull-rod A1 are absorbed by the various group of gear modules A2. Thus, the various gears form a strong instantaneous stress resistance force so as to overcome the inertia force during the opening or locking of the center lock. Thus, the gears may be damaged or worm, and its life span is affected.

(2) After the plastic gear module A2 has been damaged, the precision of the gears A2 is poor. Thus, gap is formed between the gears A2 and the gear rack A21. In the process of instantaneous driving of the gear module, the gears may be "dead locked" or dislocated 3) As a result of the drawback mentioned in (2), dislocation of gears or damages of gears shall occur.

(4) The positioning of the motor of the conventional center lock is poor, and high vibration is occurred in the process of locking and unlocking of the center lock, these will further damage the gears to wear.

SUMMARY OF THE INVENTION

Accordingly, it is an object of the present invention to provide an improved structure of a pistol-like automobile center lock driving apparatus, wherein the driving apparatus can solve the above mentioned drawbacks.

One object of the present invention is to provide an improved structure of an automobile center lock driving apparatus comprising a driving pull-rod, a transmission gear, an inertia clutching gear, a positioning block, an active gear and a motor, characterized in that the driving pull-rod is combined together with a gear rack to form as a unit and has a pulling rod at the front section and a gear rack structure at the rear section, and is retained in a side recess of the positioning block, and is formed into a restrictive railing slot structure with the side wall of a bottom seat, the transmission gear is pivotally mounted to the shaft of the positioning block and is in engagement with the active gear of the motor to transmit power to the inertia clutching gear at the bottom thereof, the bottom section of the transmission gear is provided with an engaging circular body in associated with the inertia clutching gear, the circular body has an arch-shaped engaging portion and has an external larger diameter section; the inertia clutching gear is pivotally mounted at the shaft of the positioning block and is located below the transmission gear and forms into a securing section and a gear section, the securing section is in associated with the circular body at the bottom of the transmission gear, and the gear section is in engagement with the gear rack of the driving pull-rod, and the positioning block is a disc-like structure and includes a pivotal shaft, the side recess, and a motor-positioning covering, wherein the covering enables the active gear to engage with the external transmission gear, and covers the motor, isolates and positions the motor within the motor recess at the center lock base seat.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
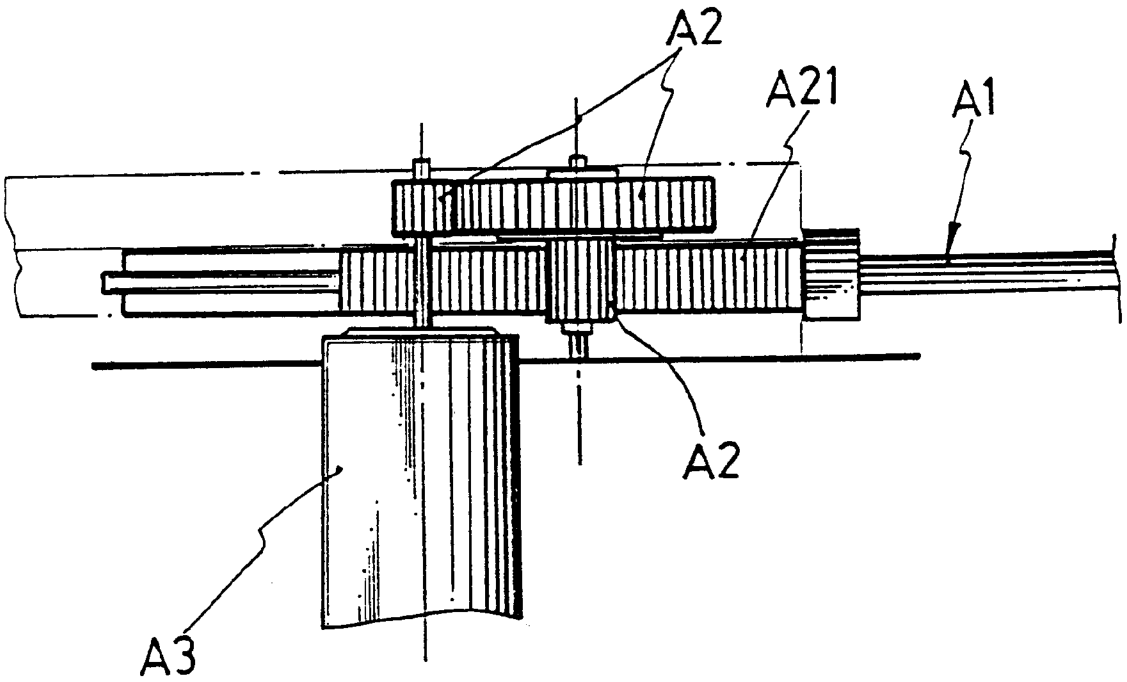
PRIOR ART FIG. 1
FIG. 1 is a sectional view of a conventional pistol-like automobile center lock driving apparatus.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
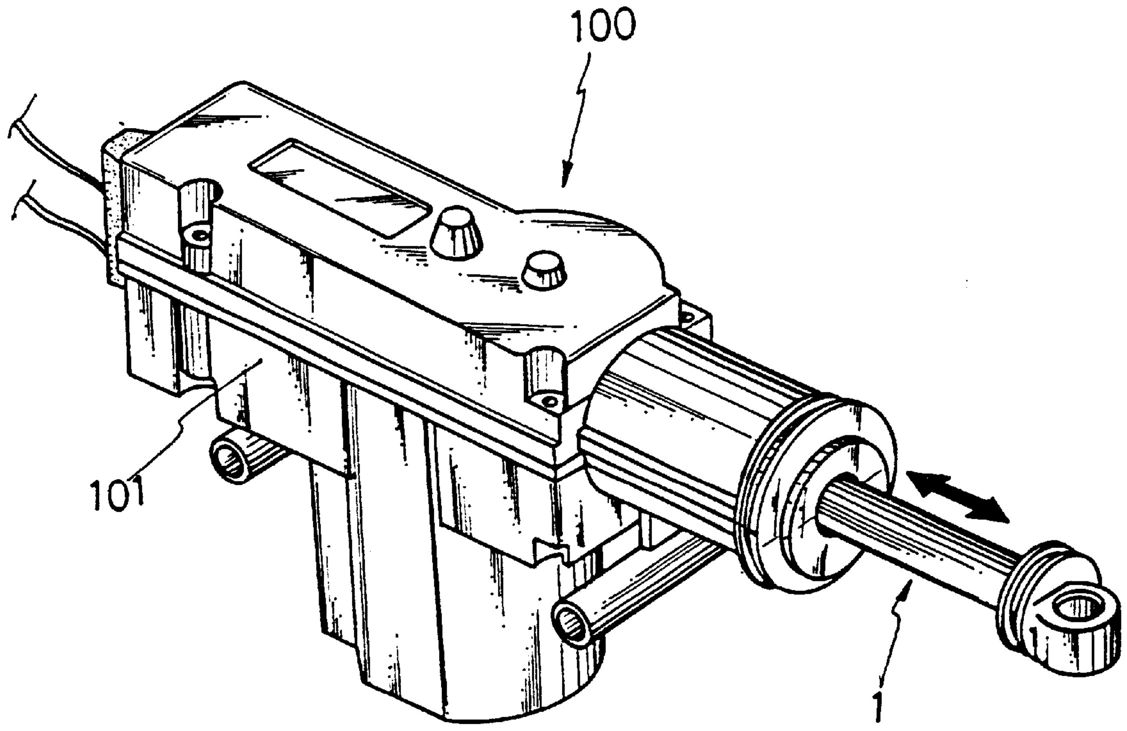
FIG. 2 is a perspective view of the pistol-like automobile center lock driving apparatus of the preferred embodiment in accordance with the present invention.
Figure 3:
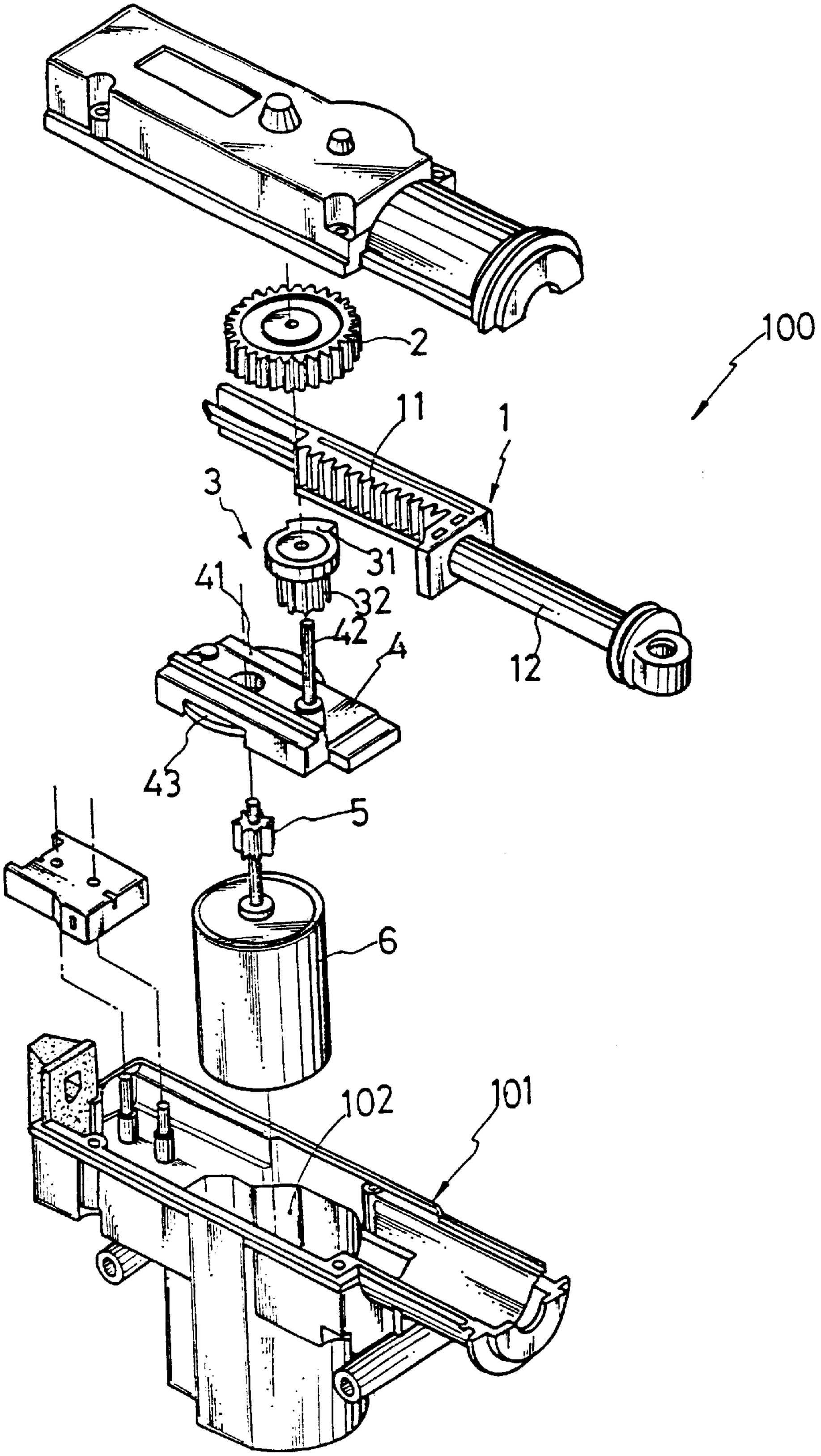
FIG. 3 is a perspective exploded view of the present preferred embodiment in accordance with the present invention.

Referring to FIGS. 2 and 3, there is shown a pistol-like automobile center lock driving apparatus 100, comprising a driving pull-rod 1, a transmission gear 2, an inertia clutching gear 3, a positioning block 4, an active gear 5 and a motor 6, wherein the driving pull-rod 1 is combined together with a gear rack 11 to form as a unit and has a pulling rod 12 at the front section and a gear rack structure 11 at the rear section. The driving pull-rod 1 is retained in a side recess 41 at the positioning block 4, and is associated with a center lock to precisely form into a restrictive railing structure, with the side wall of a bottom seat 101, so as to cause the gear rack 11 at the rear position of the driving pull-rod 1 to move forward and backward along the railing slot structure, and the pulling rod 12 achieves at an appropriate length of reciprocation.

In accordance with the present invention, the gear rack 11 of the driving pull-rod 1 is engaged with the inertia clutching gear 3. Power is transmitted from the transmission gear 2 to drive the driving pull-rod 1. The transmission gear 2 and the inertia clutching gear 3 are concentrically mounted onto the shaft 42 of the positioning block 4 such that the transmission gear 2 is on the top of the inertia clutching gear 3, and the transmission gear 2 is in engagement with the active gear 5 of the motor 6. In turn, the driving power is transmitted to the inertia clutching gear 3.

Figure 4:
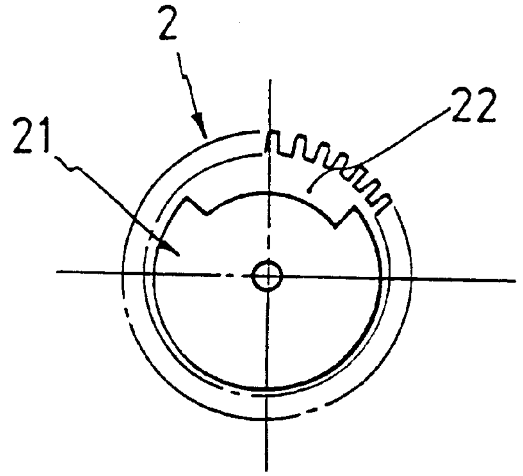
FIG. 4 is a schematic view of the engaging circular slot at the bottom section of the transmission gear.
Figure 6:
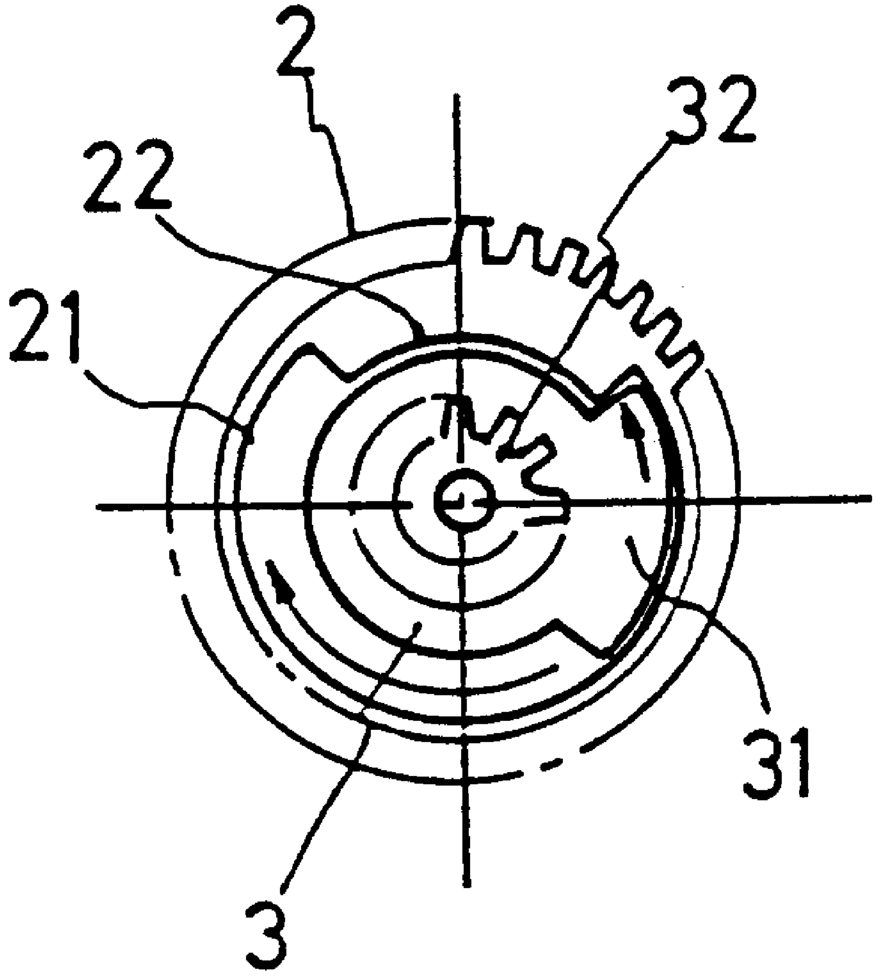
FIG. 6 is a plan view showing the association of the transmission gear and the inertia clutching gear in accordance with the present invention.

Referring to FIG. 4, there is shown the bottom section of the transmission gear 2. An engaging circular body 21 is provided at the bottom section thereof so as to associate with the inertia clutching gear 3. The circular body 21 is provided with an engaging section 22 of an appropriate length. When the clutching gear 3 is within the engaging section 22 (as shown in FIG. 6) and is driven in a positive or a negative direction by the motor, the clutching gear 3 can engage with the engaging section 22 to provide a capability of driven at the inertia clutching gear 3. The larger diameter section of the body 21 becomes an essential structure forming into a free gear gap of the entire structure.

Figure 5:
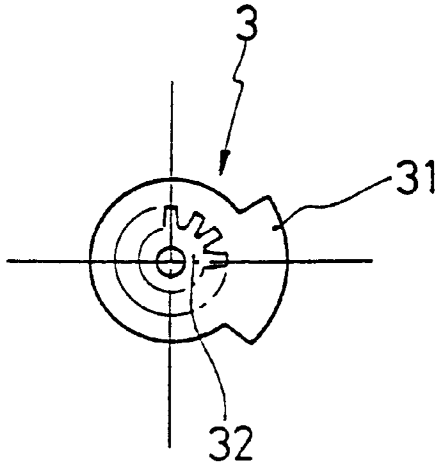
FIG. 5 is a plan view of the inertia clutching gear in accordance with the present invention.

Referring to FIGS. 3 and 5, the inertia clutching gear 3 includes a securing section 31 and a gear section 32 formed integrally as a unit. The securing section 31 is in association with the engaging circular body 21 at the bottom of the transmission gear 21 thereby forming a free gear gap. The gear section 32 is in engagement with the gear rack 11 of the driving pull-rod 1 so that it can be driven at the driving pull-rod 1.

Next, the positioning block 4 is a perfect disc-like structure comprising a pivotal transmission gear 2, and the shaft 42 of the inertia clutching gear 3, a side recess 41 and a motor positioning covering 43. The active gear 5 of the motor can engage with the external transmission gear 2 and at the same time, cover the motor 6 and isolate the motor 6, such that the motor 6 is fully at “confirmed position” without forming excessive stress at the pull-rod, and gears dislocation, and wears formed as a result of high vibration at the pull-rod.

In accordance with the present invention, when the active gear 5 is rapidly driven at the transmission gear 2, the transmission gear 2 can engage the inertia clutching gear 3 at the bottom of the fission gear 3. This causes the inertia clutching gear 3 to rapidly drive at the driving pull-rod 1. When the transmission gear 2 stops diving, the inertia clutching gear 3 continues to rotate as a result of the instantaneous inertia rotation Thus, the distance traveled by such rotation is converted into the distance of the free gear gap. In accordance with the present invention, this gap 1) solves the engaging resistance in between gear modules, i.e., solves the problem of dead-lock of gears; and 2) avoids wears formed between gear modules and avoids damages to gears.

While the invention has been described with respect to preferred embodiments, it will be clear to those skilled in the art that modifications and improvements may be made to the invention without departing from the spirit and scope of the invention therefore, the invention is not to be limited by the specific illustrative embodiments, but only by the scope of the appended claim.

I claim:

1. A structure of an automobile center lock driving apparatus comprising a driving pull-rod, a transmission gear, an inertia clutching gear, a positioning block, an active gear and a motor, wherein a) the driving pull-rod is combined together with a gear rack to form as a unit and has a pulling rod at a front section and a gear rack structure at a rear section, and is retained in a side recess of the positioning block; b) the transmission gear is pivotally mounted to a shaft of the positioning block and is in engagement with the active gear of the motor to transmit power to the inertia clutching gear at the bottom thereof, the bottom section of the transmission gear is provided with an engaging circular body in associated with the inertia clutching gear, the circular body has an arch-shaped engaging portion and has an external larger diameter section; c) the inertia clutching gear is pivotally mounted at the shaft of the positioning block and is located below the transmission gear and forms into a securing section and a gear section, the securing section is in associated with the circular body at the bottom of the transmission gear, and the gear section is in engagement with the gear rack of the driving pull-rod; and d) the positioning block is a disc-like structure and includes a pivotal shaft, the side recess, and a motor-positioning covering, wherein the covering enables the active gear to engage with the external transmission gear and covers the motor.

* * * * *